INVENTOR
Francis Antony Dawson Sadler
Scrivener & Baxter
Attorneys

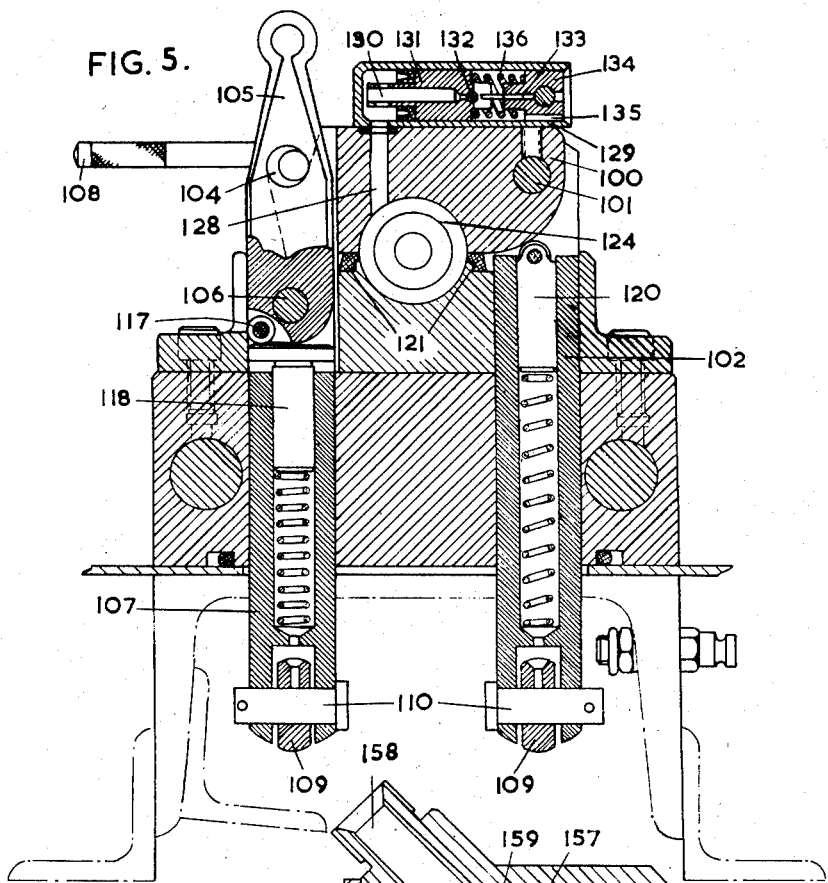
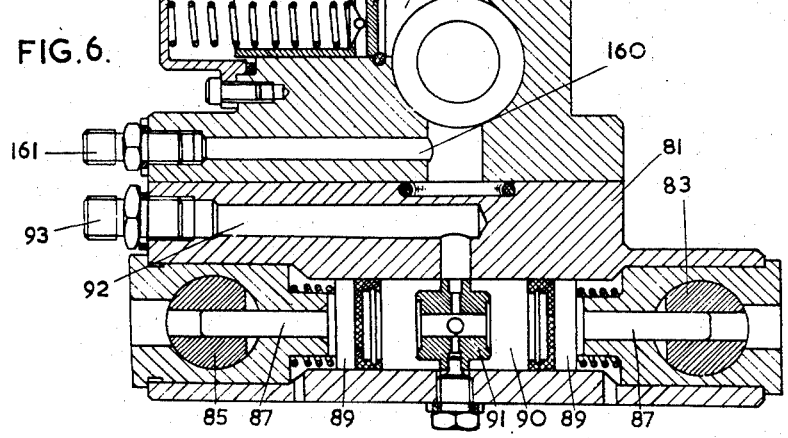

May 19, 1953 F. A. D. SADLER 2,638,777
MEANS FOR SETTING OR TESTING HYDRAULIC SHOCK ABSORBERS
Filed May 22, 1951 10 Sheets-Sheet 6

Inventor
Francis A. D. Sadler
by Scrivener & Parker
Attorneys

May 19, 1953  F. A. D. SADLER  2,638,777
MEANS FOR SETTING OR TESTING HYDRAULIC SHOCK ABSORBERS
Filed May 22, 1951  10 Sheets-Sheet 8

INVENTOR
Francis Antony Dawson Sadler
Scrivener & Parker
Attorneys

Patented May 19, 1953

2,638,777

UNITED STATES PATENT OFFICE 2,638,777

MEANS FOR SETTING OR TESTING HYDRAULIC SHOCK ABSORBERS

Francis Antony Dawson Sadler, Birmingham, England, assignor to Girling Limited, Birmingham, England, a British company Application May 22, 1951, Serial No. 227,565
In Great Britain May 23, 1950

11 Claims. (Cl. 73—11)

This invention relates to new or improved means for setting or testing hydraulic shock absorbers or dampers of the type in which damping of relative movement between two parts is effected by the flow of oil or other liquid through one or more valves which are loaded to a predetermined value.

In the manufacture and assembly of such shock absorbers or dampers it is desirable to employ means whereby the valve or each valve can be rapidly and accurately set or checked for rate of flow and/or opening pressure so that uniformity of operation can be ensured, and the object of my invention is to provide such means.

According to my invention means for setting or testing hydraulic shock absorbers or dampers, hereinafter called dampers, comprises means for holding a damper and connecting it into a closed circuit for liquid, means for adjusting a valve in the damper while liquid is passing through it, a power-driven pump or pumps for feeding liquid through the circuit at a rate of flow substantially greater than the maximum flow which can be passed through the damper, valves for controlling the flow of the liquid in the circuit independently of the damper, and means for indicating or measuring the pressure, rate of flow, and temperature of the liquid at one or more points in the circuit.

The liquid in the circuit, which will usually be oil, should be maintained at a substantially constant temperature so that the viscosity does not vary appreciably, and means for controlling the temperature of the oil and for filtering it are conveniently included in the circuit.

Preferably the whole of the operations are caused to take place in the proper sequence by operation of a single control member which may also control hydraulic means for clamping the damper. Preferably, also, means are provided for feeding liquid through the damper at two or more predetermined rates of flow.

One practical embodiment of my invention for setting or testing hydraulic shock absorbers or dampers of the direct-acting telescopic type is illustrated by way of example in the accompanying drawings in which—

Figure 5 is a vertical section on the line 5—5 of Figure 4.

Figure 6 is a vertical section on the line 6—6 of Figure 4.

The apparatus illustrated is designed for use in a factory or in a service station or garage for setting or testing hydraulic shock absorbers or dampers of the direct acting telescopic type in which a piston works in an oil-filled cylinder surrounded by a cylindrical reservoir or recuperation chamber, the piston being carried by a piston-rod working through a gland in a closure which closes one end of the cylinder and of the recuperation chamber. A spring-loaded valve arranged in the piston controls the flow of oil through the piston in one direction and a valve remote from the gland controls the flow of oil from the cylinder into the recuperation chamber. It is the setting or adjustment of these valves which controls the functioning of the shock absorber. Further lightly loaded valves in the piston and in the closure for the cylinder permit the flow of oil through the piston in the opposite direction and from the recuperation chamber into the cylinder but the loading of these valves does not require adjustment.

The apparatus illustrated permits the setting of the control valves in the piston and in the closure for the cylinder to be adjusted while oil is being circulated through the valve at a predetermined rate of flow and at a substantially constant temperature to eliminate errors due to variations in the viscosity of the oil.

Figure 3:
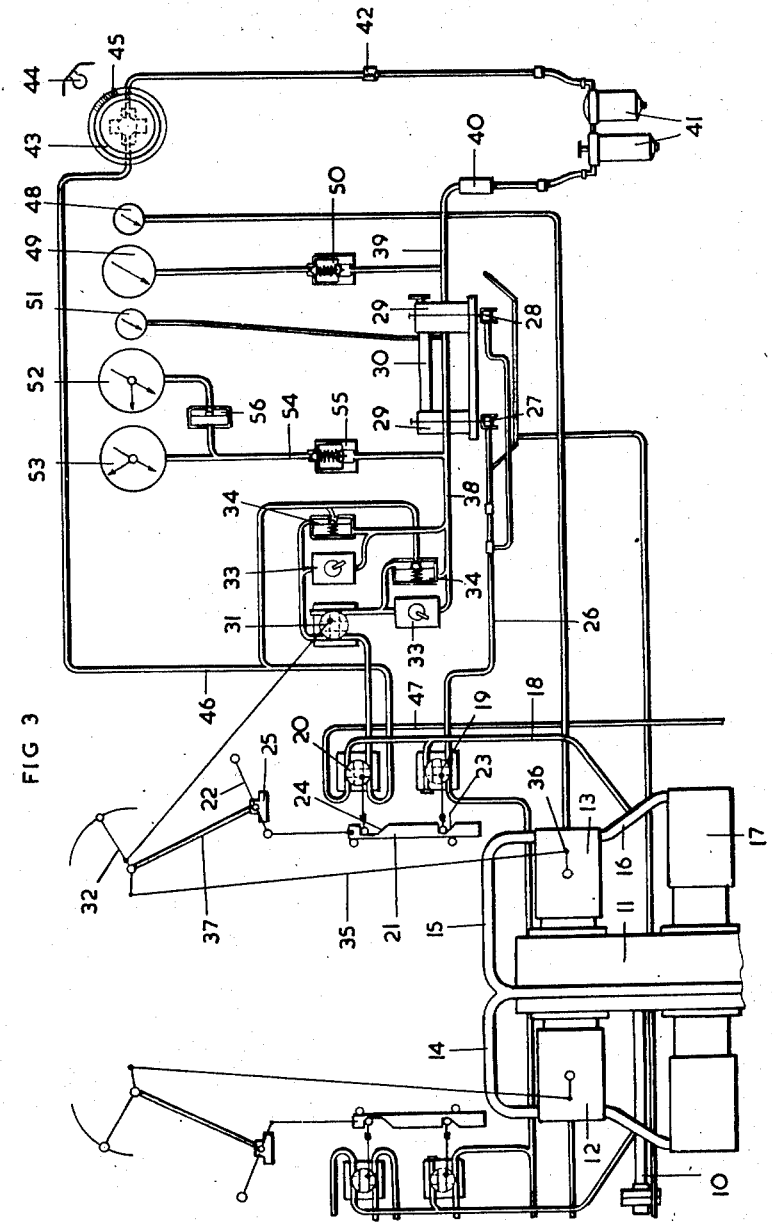
Figure 3 is a diagrammatic view of the layout of one half of the apparatus showing the flow circuits and the inter-relation of the various parts of the apparatus.

Referring first to Figure 3 of the drawings, this shows diagrammatically the means for circulating the oil, the circuit through which the oil is fed, the means for holding the damper, and the various gauges and indicators connected to the circuit at different points.

A constant speed electric motor (not shown) coupled to a shaft 10 drives through a gear-box 11 two adjustable delivery pumps 12, 13 to which oil is supplied through inlet pipes 14, 15 by a priming pump drawing oil from a storage tank of substantial capacity and feeding it to the pumps 12, 13 through filters. The pumps 12 and 13 respectively supply oil at predetermined rates of flow to separate circuits in which the damper is connected for setting of the valves in the damper piston and in the closure for the cylinder, but as the two circuits are identical only the second is illustrated in Figure 3. The fixtures in which the damper is held in the two circuits differ slightly and these are described in detail hereinafter.

The pump 13 delivers oil under pressure into a pipe 16 leading to an hydraulic motor 17 which is coupled to and supplies power to the gear-box 11, and the oil from the exhaust side of the motor is returned to the storage tank by way of a water-cooled heat exchanger which maintains the temperature of the oil in the circuit substantially constant. The object of the hydraulic motor 17 is to take care of whatever volume of the oil delivered by the pump 13 is surplus to the volume required in the flow circuit and to employ that surplus usefully in providing power.

The delivery pipe 16 from the pump 13 is connected by a branch pipe 18 to two piston-type selector valves 19, 20 operated by a common sliding bar 21 which is actuated by a control lever 22. When the bar 21 is raised an inclined surface 23 on the bar first opens the valve 19 and then after a certain amount of lost motion a second inclined surface 24 opens the valve 20. The rate of movement of the lever 22 is controlled by connecting it to the bar 21 through a damper 25 to prevent the valve 20 from being opened too rapidly after the valve 19.

When the valve 19 is opened oil under pressure is supplied through a pipe 26 to hydraulic cylinders 27, 28 for operating clamps at opposite ends of a fixture 29 in which the damper 30 is held.

When the valve 20 is opened it supplies oil to a second selector valve 31 which is operated by a lever 32 and is arranged to direct the oil through either of two circuits, a high flow circuit and a low flow circuit. Each circuit includes a flow control valve 33 and a valve loader 34, of which the function is to limit the inlet pressure on the flow control valve to a maximum value over the outlet pressure. The lever 32 which operates the valve 31 also operates, through a link 35, an output control 36 for the pump 13, and the lever is interlocked by a coupling 37 with the control lever 22 so that the lever 22 cannot be operated to open the valves 19 and 20 unless the lever 32 is in a position corresponding to the selection of the high flow circuit. Through whichever flow circuit is selected the oil is fed through a pipe 38 into the damper by way of one end of the fixture. The oil after passing through the valve in the damper flows by way of a pipe 39 incorporating a visible flow indicator 40 and through tandem filters 41 and a non-return valve 42 to a flow-meter 43. The rate of flow is indicated by a rotating stroboscopic disc illuminated by a neon lamp 44 in an alternating current circuit, the disc having two concentric rings of markings 45 corresponding to two predetermined rates of flow. From the flowmeter the oil returns through a pipe 46 to the valve 20 and from there through a pipe 47 to the storage tank by way of a non-return valve and the oil cooler.

The pressure of the oil at the inlet of the pump 13 is shown by a pressure gauge 48.

The pressure of the oil leaving the damper is shown by the gauge 49 which is connected to the outlet pipe 39 through a trapped line pressure restriction valve 50.

The temperature of the oil entering the damper is shown by a remote reading thermometer 51.

The gauges 52 and 53 are respectively low and high range gauges showing the pressure of the oil entering the damper, both gauges being connected to the pipe 38 by a pipe 54 incorporating a trapped pressure line restriction valve 55. The low range valve is protected by a safety device 56 incorporating a diaphragm and a valve actuated by the diaphragm to prevent the pressure reaching the gauge from exceeding the value permissible on that gauge.

All the apparatus illustrated in Figure 3 and described above and the corresponding apparatus to which oil is supplied by the pump 12 are arranged in a casing or cabinet to form a complete unit which has only to be connected to a water supply and an electric current supply and can be installed in any convenient position.

Figure 1:
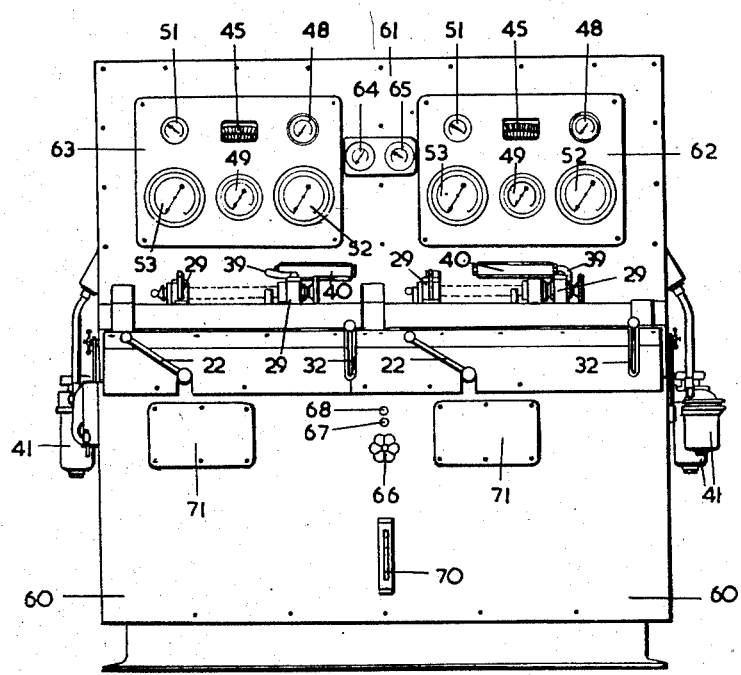
Figure 1 is a front elevation of the complete apparatus.
Figure 2:
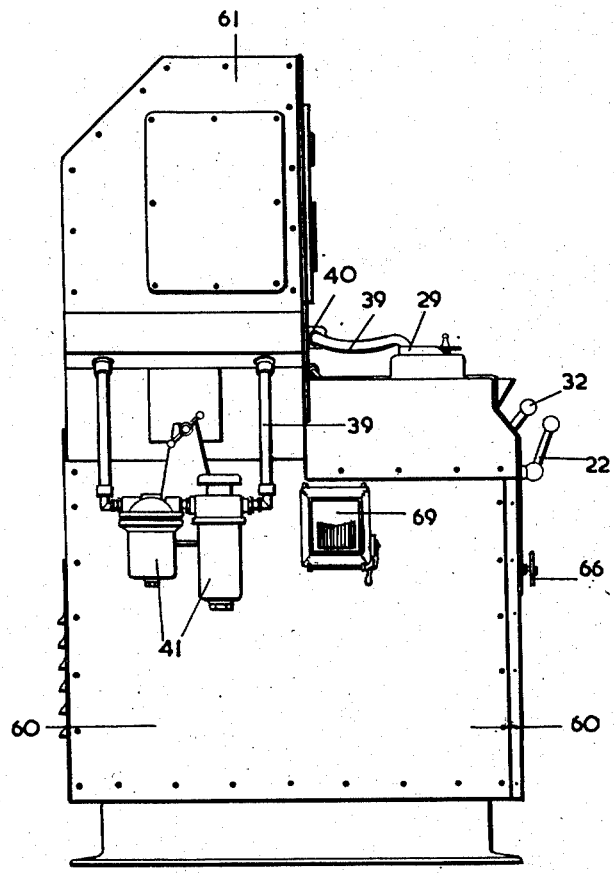
Figure 2 is a side elevation of the complete apparatus.

A practical design of cabinet is shown in Figures 1 and 2 in which the various parts visible have been given the reference numerals used in Figure 3.

The lower part or base 60 of the cabinet houses the motor, pumps, oil storage tank and oil cooler.

The upper part 61 of the cabinet houses the various gauges, meters and thermometers which are grouped in vertical panels 62, 63 facing the operator.

The fixtures in which the dampers are held during the setting of the valves are mounted on the top of the base in front of the panels.

The gauges 64, 65 between the panels show respectively the oil pressure in the lubrication system of the gear-box and the temperature of the oil leaving the cooler.

The rate of flow of water through the cooler is controlled by a hand-wheel 66 on the front of the cabinet.

The starting and stopping of the motor which drives the pumps are controlled by push buttons 67, 68 above the hand-wheel 66, the main switch and fuse-box 69 being mounted on one side of the cabinet.

The level of the oil in the storage tank is shown by a gauge 70 on the front of the base of the cabinet.

The flow control valves are housed in the base of the cabinet and access is obtained to them through openings covered by readily detachable plates 71.

Figure 4:
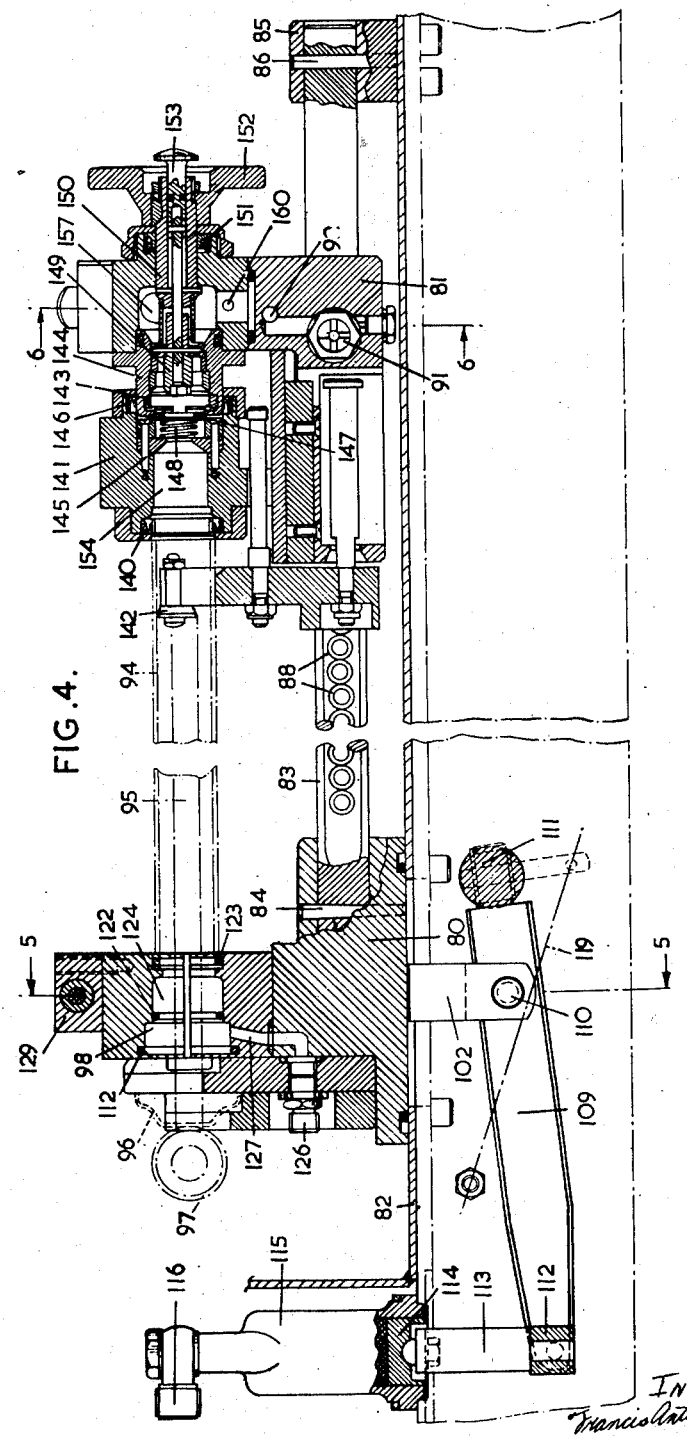
Figure 4 is a longitudinal section of the fixture in which the shock absorber is mounted while oil is forced through it at a predetermined rate of flow and a valve controlling the passage of oil from the cylinder is set or adjusted.
Figure 7:
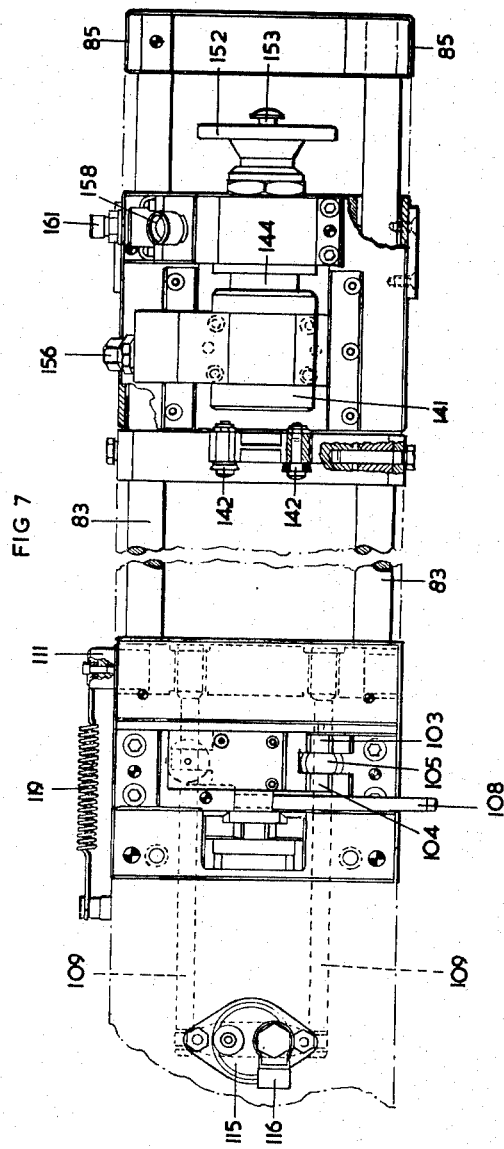
Figure 7 is a plan of the fixture.
Figure 8:
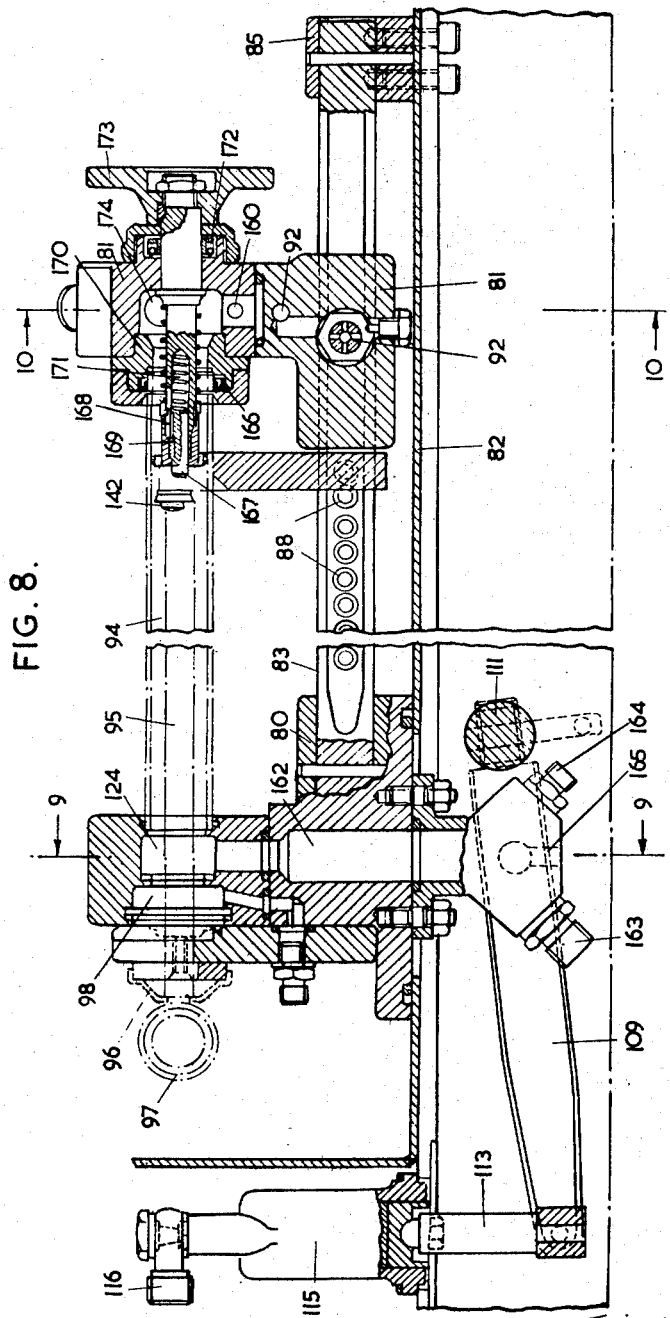
Figure 8 is a longitudinal section of the fixture in which the shock absorber is mounted while a valve in the piston is set or adjusted under flow conditions.
Figure 9:
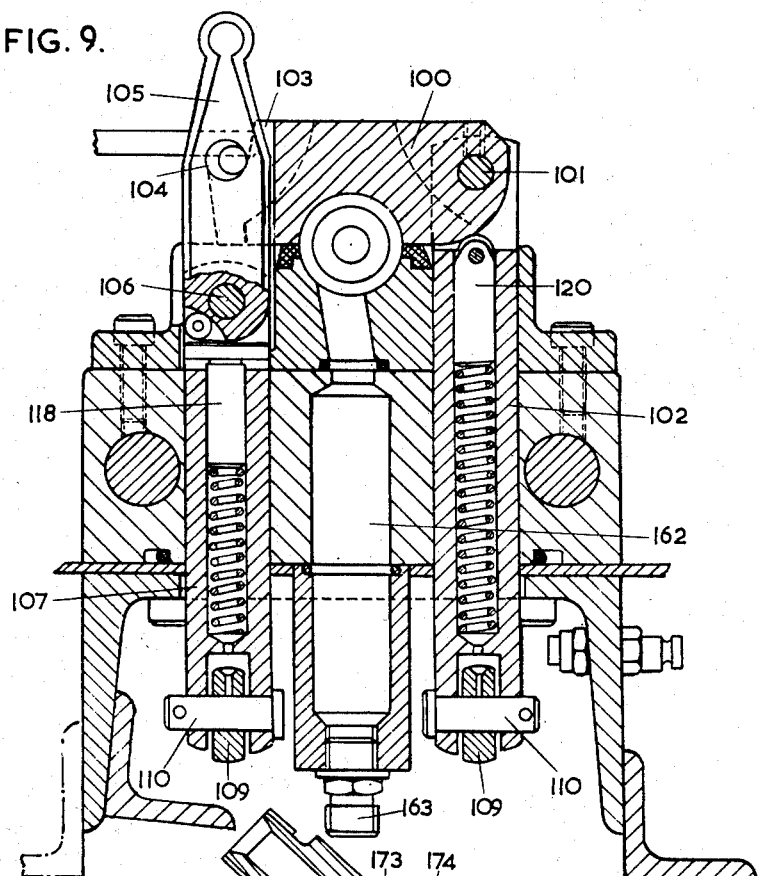
Figure 9 is a vertical section on the line 9—9 of Figure 7.
Figure 10:
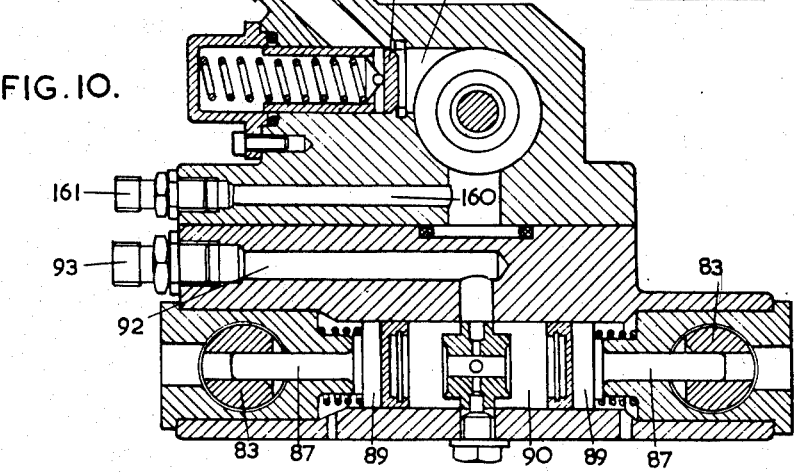
Figure 10 is a vertical section on the line 10—10 of Figure 8.
Figure 11:
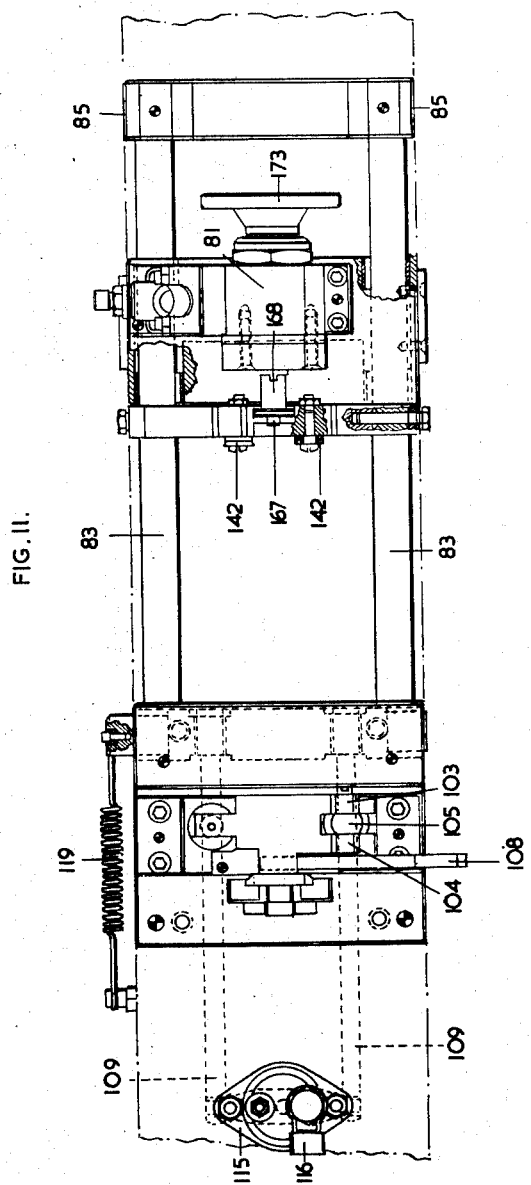
Figure 11 is a plan of the fixture shown in Figures 8 to 10.

The fixture which receives the damper during the setting of the valve in the closure for the base of the cylinder is illustrated in Figures 4, 5 and 7.

The fixture comprises two main parts 80 and 81. The part 80 is fixed to a base plate 82 while the part 81 is slidably mounted on two parallel longitudinal bars 83 which are fixed at one end in the part 80 by taper pins 84 and at the other end in stationary blocks 85 by taper pins 86.

The position of the part 81 on the bars depends on the axial length of the damper and the part is locked in its set position by opposed pegs 87 engaging in aligned holes 88 in the bars. The pegs are carried by opposed pistons 89 working in a transverse double-ended hydraulic cylinder 90 in the base of the part 81, and the pistons are urged apart to force the pegs into the holes in the bars when oil under pressure is admitted to a fitting 91 in the centre of the cylinder. This fitting communicates through a passage 92 in the body of the part 81 with a union 93 which is connected to the pipe-line 26 (Figure 3).

Figure 12:
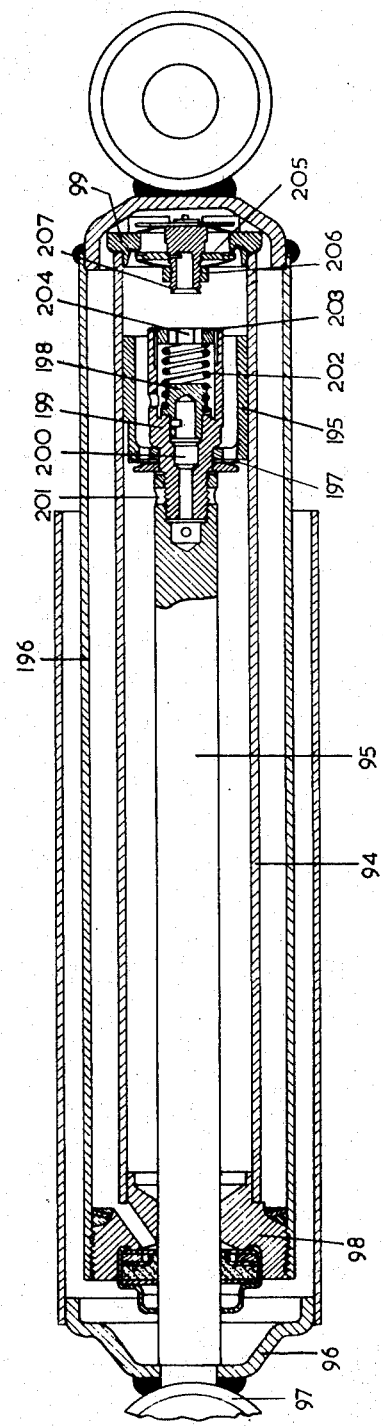
Figure 12 is a longitudinal section of a shock absorber of the type which our improved apparatus is designed for setting and testing.

A shock absorber of the type which the apparatus is designed to set and test is shown in section in Figure 12 of the accompanying drawings. It comprises a cylindrical barrel 94 in which works a piston 195 carried by a piston-rod 95 of which the outer end is fixed in a cap 96 having an eye 97 for the connection of the piston-rod to a part of the vehicle. The piston-rod works through a gland in a head 98 which is adapted to be secured into one end of the barrel and to be screwed into the open end of a cylindrical reservoir or recuperation chamber 196 which normally encloses the cylinder but is not required for the setting operation.

Passage of liquid through the piston in one direction is controlled by a lightly loaded disc valve 197 of which the setting is not critical. Passage of liquid through the piston in the other direction is controlled by a spring loaded valve 198 engaging a seating in a fitting 199 which is screwed into the piston-rod 95 and secures the piston to the rod. The seating with which the valve 198 engages is at the outer end of an axial bore 200 in the fitting 199 communicating with a transverse bore 201 in the piston-rod. The valve 198 is loaded by a spring 202 arranged between the valve and a ring 203 screwed into the outer end of the fitting 199. There is a hexagonal opening 204 in the ring to receive a key or the like, and the loading of the valve is adjusted by screwing the ring into or out of the fitting. The end of the cylinder remote from the head 98 is closed by a base fitting 99 containing a spring-loaded valve 205 which controls the passage of oil from this end of the cylinder into the recuperation chamber 196.

The setting of this valve is effected by rotating a hexagonal nut 206 on a stem 207 of which the inner end has a hexagonal or other head or has a hexagonal nut fixed to it.

The fixture shown in Figure 4 is employed to hold the damper during the setting of the valve 205 in the base fitting 90. The damper is shown in dotted lines in Figure 4.

To fit the damper into the fixture the head 98 is moved axially on the piston-rod away from the end of the cylinder barrel and the base closure 99 is separated from the barrel. The head is received and held in a seating or clamp in the part 80 of the fixture as shown in Figures 4 and 5. The clamp is divided in a horizontal plane containing the axis of the damper, the lower half of the clamp being fixed and the co-operating upper half being in a hinged block 100.

The block is hinged at one side by a pin 101 to the upper end of a vertical spindle 102 slidably mounted in a bore in the fixture. On the other side the block has two parallel lateral projections 103 adapted to be engaged by opposite ends of a locking pin 104 mounted in a lever 105 pivoted to rock about a pivot 106 in the upper end of a second vertical spindle 107 slidably mounted in a bore in the fixture. A handle 108 on the block 100 extends laterally on one side of and beyond the lever 105.

The lower ends of the spindles are slotted to receive substantially horizontal levers 109 to which the spindles are pivotally coupled by pins 110. The levers are fixed at one end in a transverse shaft 111 which forms a fulcrum for them and the other ends of the levers are connected by a transverse bar 112. At the centre of its length this bar carries an upstanding rod 113 of which the upper end is engaged by the piston 114 of an hydraulic cylinder 115 which is connected by a union 116 to the pipe-line 26 (Figure 3). When oil under pressure is supplied to the cylinder 115 by the opening of the valve 19 the levers are moved downwardly about their fulcrum and draw the spindles 102 and 107 downwardly to urge the block 100 against the fixed lower part of the clamp and so to clamp the head 98 of the damper in position as shown in Figure 5. The lever 105 is locked in the engaged position by a roller 117 against which bears the head of a spring-loaded plunger 118 mounted in an axial bore in the spindle 107.

When the valve 19 is closed and the cylinder 115 is de-energised the spindles 102 and 107 are free to rise and are raised by a spring 119 connected between a fixed anchorage and an arm projecting downwardly from the fulcrum shaft 111. The roller 117 can then press the plunger 118 downwardly and the lever 105 can be swung outwardly on its pivot to free the pin 104 from the projections on the block 100.

The block can then be swung upon its pivot to release the damper, the block being resiliently retained in the raised position by the engagement with a curved edge on the block of a roller on the upper end of a spring-pressed plunger 120 mounted in a bore in the spindle 102.

A seal is made between the two parts of the clamp by packing strips 121, and further seals 122 surround the head 98 at each end of it. The adjacent end of the cylinder barrel of the damper is received in a seal 123 at the inner end of the clamp.

There is thus a sealed space 124 in the clamp around the piston-rod of the damper between the head 98 and the end of the cylinder barrel and this space is in communication with the cylinder barrel.

A union 126 connected to the pipe-line 38 (Figure 3) communicates by way of a passage 127 with an inclined drilling in the head 98 which, when the damper is in use, conducts any oil which leaks past the piston-rod into the recuperation chamber. Any oil flowing through this drilling during the setting operation is returned into the main flow circuit between the fixture and the flow-meter so that the total flow shown by the meter is the same as under normal working conditions.

The space 124 communicates by way of a passage 128 with an air release valve 129 mounted on the top of the block 100. Any air present in the oil passes into the closed left-hand end of the valve housing, through a bore 130 in a plunger 131, past a ball 132 which is normally spaced from the end of a rod 133 fixed in a closure 134 for the other end of the housing, and out to atmosphere through a groove 135 in the closure 134.

A spring 136 normally holds the plunger in such a position that the ball 132 is clear of a seating at the end of the bore 130 so that air can pass freely, but if oil passes up into the valve housing it builds up a pressure on the left-hand end of the plunger and moves the plunger to the right against the spring loading so that the bore 130 is closed by the ball 132 which abuts against the rod 133 and the oil cannot escape.

The other end of the damper cylinder barrel is slidably engaged in an annular seal 140 in a bore in a fitting 141 coupled to the part 81 of the fixture. At an intermediate point in its length the barrel is pressed down between two conical rubber gripping members 142 which hold it down while the other connections are being made.

The base closure 99 of the cylinder barrel in which the valve to be set is located is received in an annular seal 143 in an extension 144 of the part 81 and is held in position against an internal shoulder in the extension by a collar backed by plungers 145 in the fitting 141. The joint between the extension 144 and the fitting 141 is made by an annular seal 146. The hexagonal head on the valve stem 207 in the closure 99 is received in a complementary opening in a plate 147 which is urged against the closure by a spring 148. The adjusting nut 206 is engaged by fingers on the inner end of a sleeve 149 coupled to a hollow spindle 150 which extends through a gland 151 and carries a hand-wheel 152 on its outer end. Thus rotation of the hand-wheel rotates the adjusting nut to adjust the loading of the valve in the closure 99. After the setting has been effected the fitting 141 is moved away from the part 81 and the closure 99 is pushed out of the extension 144 by a plunger 153 passing axially through the spindle 150 and having a knob on its outer end.

During the setting of the valve, oil is fed into the space 154 in the fitting 141 between the end of the barrel and the base closure 99 of the damper, this space communicating with a union 156 connected to the pipe-line 38. After passing through the valve in the closure the oil passes out through a passage 157 to a union 158 which is connected to the pipe-line 39. The passage 157 has mounted in it a spring loaded non-return valve 159 to prevent oil from the rest of the system draining back when the damper is taken out of the fixture.

Figure 6 shows a further passage 160 connecting the outlet passage 157 with a union 161 to which is connected a pipe leading to the gauge 49 which shows the outlet pressure.

The other fixture in which the damper is held while the valve 198 in the piston is set is illustrated in Figures 8 to 11. Parts identical with parts in the first fixture have been given the same reference numerals.

The clamp for the head 98 of the damper is the same as in the other fixture and need not be further described.

In this case, however, the main oil feed into the damper is into the space 124 in the fixture by way of a passage 162 from a union 163 which is connected to the pipe line from the flow control valve. Another union 164 receives a pipe leading to the pressure gauges which show the inlet pressure, and the bulb of a remote-reading thermometer is inserted into an opening 165.

The other end of the cylinder barrel is received in a sealing ring 166 at the end of a bore in the part 81 of the fixture.

The hexagonal opening 204 in the angularly movable ring 203 of the adjustable valve 198 in the piston of the damper is engaged by the hexagonal end of a plunger 167 which is slidably mounted in an axial bore in a sleeve 168 to which it is coupled by a key 169 and which is itself slidably coupled to a spindle 170. The plunger is urged into engagement with the valve by a spring 171. The spindle 170 extends through a gland 172 in the fixture and has a hand-wheel 173 on its outer end for rotating it to adjust the valve.

After the oil has passed through the valve it leaves the fixture through a passage 174 containing a non-return valve 175 and leading to a union 176.

When setting the valve in the piston the base closure 99 of the cylinder is of course left off.

Setting of either valve can be effected very rapidly and easily. After the damper has been inserted into the appropriate fixture the operator simply has to actuate the control levers in the correct sequence and to watch the flow meter and pressure gauges while he adjusts the valve by means of the hand-wheel on the fixture until the pressures on the gauges correspond to those given by preset stationary pointers. Uniformity of setting can thus be readily ensured.

I claim:

1. Apparatus for setting hydraulic dampers of the direct-acting type in which damping of relative movement between two parts is effected by the flow of oil or other liquid through valves located in the piston and in the cylinder closure of a cylinder and piston assembly, comprising a closed circuit for liquid, means for holding a damper and connecting it into said circuit, a power-driven pump for feeding liquid into the circuit at a rate of flow substantially greater than the maximum rate which can be passed through the damper, means for adjusting a valve in the damper while liquid is passing through it, means for controlling the flow of liquid in the circuit independently of the damper, and means for indicating the pressure and rate of flow of the liquid at points in the circuit.

2. Apparatus for setting hydraulic dampers of the direct-acting type in which damping of relative movement between two parts is effected by the flow of oil or other liquid through valves located in the piston and in the cylinder closure of a cylinder and piston assembly, comprising a closed circuit for liquid, hydraulically actuated clamps for holding a damper and connecting it into said circuit, a power-driven pump for feeding liquid into the circuit at a rate of flow substantially greater than the maximum rate which can be passed through the damper, means for adjusting a valve in the damper while liquid is passing through it, means for controlling the flow of liquid in the circuit independently of the damper, a valve for supplying liquid from the circuit to the hydraulically actuated clamps, means for indicating the pressure of the liquid in the circuit on each side of the damper, and means for indicating the rate of flow of liquid through the damper.

3. Apparatus as in claim 2 wherein said means for controlling the rate of flow of liquid in the circuit comprise a main control valve, a selector valve, and two constant flow circuits arranged in parallel between said selector valve and the circuit and giving different rates of flow, said control valve controlling the passage of liquid from the pump to said selector valve which directs the liquid into the circuit through either of said constant flow circuits.

4. Apparatus as in claim 2 wherein said valve for supplying liquid to the clamps and a valve forming part of the means for controlling the flow of liquid in the circuit independently of the damper are operated successively by a single control member.

5. Apparatus as in claim 2 wherein said means for controlling the rate of flow in the circuit comprise a main control valve, a selector valve, and two constant flow circuits giving different rates of flow arranged in parallel between said selector valve and said circuit, each of said constant flow circuits incorporating a flow control valve and a valve loader.

6. Apparatus as in claim 2 wherein the means for indicating the rate of flow in the circuit comprise a flow-meter indicating two predetermined rates of flow, and the means for controlling the flow of liquid in the circuit independently of the damper incorporate valves providing two different rates of flow and means for selecting either rate of flow.

7. Apparatus as in claim 2 wherein means are provided for filtering the liquid in the circuit and for maintaining it at a substantially uniform temperature.

8. Apparatus as in claim 2 wherein said circuit comprises a tank for liquid, a pump to which liquid is supplied from said tank, a gear-box, an electric motor driving said pump through said gear-box, an hydraulic motor coupled to said gear-box, and means for supplying to said hydraulic motor liquid delivered by said pump and not required in said circuit.

9. Apparatus for setting hydraulic dampers of the direct-acting type in which damping of relative movement between two parts is effected by the flow of oil or other liquid through valves located in the piston and in the cylinder closure of a cylinder and piston assembly, comprising a closed circuit for liquid, a power-driven pump for delivering liquid into the circuit at a rate of flow substantially greater than the maximum rate which can be passed through the damper, means for controlling the flow of liquid in the circuit independently of the damper, means for indicating the pressure and rate of flow of the liquid at points in the circuit, and means for holding a damper and connecting it into the circuit, said means comprising a fixture in two parts of which one is fixed and incorporates a clamp for one end of the damper and the second receives the other end of the damper and is adjustable towards and away from the other and incorporates manually operated rotatable means for co-operating with and setting a valve in the damper while liquid is flowing through it, and means being incorporated in the fixture for feeding liquid to the damper on one side of said valve and taking it from the other side.

10. Apparatus as in claim 9 incorporating hydraulic cylinders for actuating the clamp in the first part of said fixture and for locking the second part of said fixture relative to the first, and means for supplying liquid from the circuit to said cylinders.

11. Apparatus for setting hydraulic dampers of the direct-acting type in which damping of relative movement between two parts is effected by the flow of oil or other liquid through valves located in the piston and in the cylinder closure of a cylinder and piston assembly comprising two closed circuits for liquid each incorporating a fixture for holding a damper and connecting it into said circuit, a power-driven pump for feeding liquid into the circuit at a rate of flow substantially greater than the maximum rate which can be passed through the damper, means for adjusting a valve in the damper while liquid is passing through it, means for controlling the flow of liquid in the circuit independently of the damper, means for indicating the pressure of the liquid in the circuit on each side of the valve, means for indicating the rate of flow of the liquid through the valve, an electric motor driving the pumps in both circuits, a tank from which liquid is supplied to both pumps and to which liquid returns after passing through both circuits, means for maintaining the liquid at a substantially constant temperature, and a cabinet in which all of said parts are mounted.

FRANCIS ANTONY DAWSON SADLER.

References Cited in the file of this patent

UNITED STATES PATENTS

| Number | Name | Date |
|---|---|---|
| 982,773 | Wood | Jan. 24, 1911 |
| 2,101,228 | Willard | Dec. 7, 1937 |
| 2,129,763 | Hart | Sept. 13, 1938 |